United States Patent
Privett et al.

(10) Patent No.: US 9,555,508 B2
(45) Date of Patent: Jan. 31, 2017

(54) TRUSS SUPPLY AND RIGGING TABLE SYSTEMS AND METHODS

(75) Inventors: Corey D. Privett, Norfolk, NE (US); Danny R. Buckendahl, Norfolk, NE (US); Michael T. Chikos, Norfolk, NE (US); Frederick J. Dederman, Norfolk, NE (US); Shane P. Finkral, Battle Creek, NE (US); Jeffrey S. Gallop, Norfolk, NE (US); Doyle G. Hopper, Jr., Norfolk, NE (US); Daniel W. Johnson, Norfolk, NE (US); Terrence L. Jueden, Hartington, NE (US); James P. Laudenklos, Newman Grove, NE (US); Jordan S. Otjen, Battle Creek, NE (US); James L. Pofahl, Norfolk, NE (US); Brian L. Richter, Battle Creek, NE (US); Russell L. Sila, Madison, NE (US); Gerald J. Wieser, Norfolk, NE (US); Kyle J. Zautke, Pierce, NE (US)

(73) Assignee: NUCOR CORPORATION, Charlotte, NC (US)

(*) Notice: Subject to any disclaimer, the term of this patent is extended or adjusted under 35 U.S.C. 154(b) by 1284 days.

(21) Appl. No.: 13/460,364

(22) Filed: Apr. 30, 2012

(65) Prior Publication Data
US 2013/0283617 A1    Oct. 31, 2013

(51) Int. Cl.
*B25B 27/14*    (2006.01)
*B23P 19/04*    (2006.01)

(52) U.S. Cl.
CPC ........... *B23P 19/04* (2013.01); *Y10T 29/49625* (2015.01)

(58) Field of Classification Search
USPC ....................................................... 29/281.5
See application file for complete search history.

(56) References Cited

U.S. PATENT DOCUMENTS

| | | | | |
|---|---|---|---|---|
| 3,319,323 A | * | 5/1967 | Groat | B27F 7/155 227/152 |
| 3,358,348 A | * | 12/1967 | McGlinchey | B27F 7/155 100/100 |
| 3,537,168 A | * | 11/1970 | Carroll | B27M 3/0073 227/152 |
| 5,092,028 A | * | 3/1992 | Harnden | B23P 19/04 269/320 |
| 5,123,587 A | * | 6/1992 | Ashmore | B23K 37/04 228/170 |
| 5,170,558 A | * | 12/1992 | Hubbard | B23Q 7/001 227/39 |
| 5,361,495 A | * | 11/1994 | Pyle | B27F 7/155 269/910 |

(Continued)

*Primary Examiner* — Alvin Grant
(74) *Attorney, Agent, or Firm* — Moore & Van Allen PLLC; Jeffrey R. Gray

(57) ABSTRACT

Embodiments of the invention relate to a rigging table system that delivers the members from the cutting station to a location behind the workers at the rigging table, transports the members vertically below the surface of the floor on which the workers stand, horizontally transports the members underneath the floor on which the workers stand, and delivers the members vertically above the surface of the floor in front of the workers for assembly on the rigging table. The members are delivered through the use of systems that drop, slide, lift, and extend the members of the truss to the desired locations using automatic sensors or call buttons.

20 Claims, 6 Drawing Sheets

(56) References Cited

U.S. PATENT DOCUMENTS

| | | | | |
|---|---|---|---|---|
| 5,553,375 | A * | 9/1996 | Powers | B27F 7/155 100/210 |
| 7,165,304 | B2 * | 1/2007 | Smith | B27M 3/0073 29/281.5 |
| 7,832,103 | B1 * | 11/2010 | Whelan | F16L 3/221 248/68.1 |
| 2006/0059687 | A1 * | 3/2006 | Robin | B21D 53/74 29/897.32 |
| 2007/0256391 | A1 * | 11/2007 | Mifsud | B21F 27/128 52/745.05 |
| 2008/0092371 | A1 * | 4/2008 | Harrison | B23P 19/00 29/700 |
| 2008/0250657 | A1 * | 10/2008 | Bianchin | B25H 7/00 33/16 |
| 2008/0300713 | A1 * | 12/2008 | Leith | B23P 21/004 700/117 |
| 2009/0289403 | A1 * | 11/2009 | Muncie | B23P 19/04 269/152 |
| 2010/0030363 | A1 * | 2/2010 | McAdoo | B25J 11/00 700/112 |
| 2010/0061829 | A1 * | 3/2010 | McAdoo | B25J 5/04 414/222.02 |
| 2013/0042480 | A1 * | 2/2013 | Turulin | B27F 7/155 29/897.312 |

* cited by examiner

TRUSS SUPPLY AND RIGGING TABLE SYSTEMS AND METHODS

BACKGROUND

Tables used to assemble trusses have typically incorporated jigs or supports that hold the chord members and web members together in the desired configuration, which allows a worker to weld the chord members and web members together in the desired configuration. The members used by the workers to create the trusses are usually manually transported to the table by the worker from a cutting station at which the members are sliced, cut, etc. into the proper lengths depending on the requirements of the truss. In other situations the members may be delivered to or near the table through the use of a machine, such as through a fork lift, conveyor belt, rollers, or the like. Regardless of how the members are delivered, the worker typically physically picks up the members, lifts them over their heads, turns around, and/or otherwise perform a manual repetitive operation hundreds of times a day that could cause physical harm to the worker, other workers, or otherwise interrupt the process of assembling trusses on the table.

SUMMARY OF THE EMBODIMENTS OF THE INVENTION

The present invention relates generally to a rigging table system that delivers the members from the cutting station to a location behind, or otherwise near, the workers at the rigging table (e.g., through the use of rollers, or other like system), transports the members generally vertically below the workers, generally horizontally underneath the workers, and delivers the members generally vertically in front of the workers for assembly on the rigging table.

One embodiment of the invention is a rigging table system comprising: a rigging table; a support floor adjacent at least one side of the rigging table having a first support floor side and a second support floor side; a slider support located below the support floor having a first slider support side and a second slider support side; a dropping system, wherein the dropping system delivers a member to the first slider support side below the support floor adjacent the first support floor side; a slider system, wherein the slider system transports the member from the first slider support side to the second slider support side below the support floor; and a lifting system, wherein the lifting system lifts the member from the second slider support side to above the support floor adjacent the second support floor side.

In further accord with an embodiment of the invention, the rigging table system further comprises an actuating support, wherein the actuating support is extended outwardly to deliver the member from the lifting system out from a position under the rigging table. In another embodiment of the invention, the actuating support is extended outwardly by a call signal activated by a worker. In still another embodiment of the invention, the actuating support comprises hooks.

In yet another embodiment of the invention, the rigging table system further comprises a delivery system configured for transporting the members from a cutting station to a location adjacent the first side of the support floor, and wherein the delivery system comprises a plurality of rollers.

In further accord with an embodiment of the invention, two or more of the dropping system, the sliding system, or the lifting system are a single system.

In another embodiment of the invention, the rigging table system further comprises one or more sensors, wherein the sensors determine when the member is located in the dropping system, the sliding system, or the lifting system and automatically delivering the member to the dropping system, the sliding system, or the lifting system when no member is detected.

In yet another embodiment of the invention, the rigging table system further comprises one or more sensors, wherein the sensors determine a position of a catcher in the dropping system, a slider in the slider system, or a lifter in the lifting system and automatically delivering the member to the dropping system, the sliding system, or the lifting system when the position of the catcher, the slider, or lifter is in a home position.

Another embodiment of the invention is a rigging table system comprising: a rigging table; a support floor on adjacent at least one side of the rigging table having a first support floor side and a second support floor side; a slider support located below the support floor having a first slider support side and a second slider support side; a slider system, wherein the slider system transports a member from the first slider support side to the second slider support side below the support floor; and a lifting system, wherein the lifting system lifts the member from the second slider support side to above the support floor adjacent the second support floor side.

In further accord with an embodiment of the invention, the rigging table system further comprises an actuating support, wherein the actuating support is extended outwardly to deliver the member from the lifting system out from a position under the rigging table.

In another embodiment of the invention, the rigging table system further comprises a delivery system configured for transporting the members from a cutting station to the first slider support side.

In yet another embodiment of the invention the sliding system and the lifting system are a single system.

In still another embodiment of the invention, the rigging table system further comprises one or more sensors, wherein the sensors determine when the member is located in the dropping system, the sliding system, or the lifting system and automatically delivering the member to the dropping system, the sliding system, or the lifting system when no member is detected, or wherein the sensors determine a position of a catcher in the dropping system, a slider in the slider system, or a lifter in the lifting system and automatically delivering the member to the dropping system, the sliding system, or the lifting system when the position of the catcher, the slider, or lifter is in a home position.

Another embodiment of the invention is a rigging table system comprising: a rigging table; a support floor adjacent at least one side of the rigging table having a first support floor side and a second support floor side; and a lifting system, wherein the lifting system lifts a member from under the support floor to above the support floor adjacent the second support floor side.

Another embodiment of the invention is a method for assembling trusses comprising: lifting a member, through the use of a lifting system, from below a support floor to above the support floor; placing the member on the rigging table; and assembling the member on the rigging table.

In further accord with an embodiment of the invention, the method for assembling trusses further comprises transporting the member, through the use of a slider system, from a first slider support side to the second slider support side of a slider support located below the support floor.

In another embodiment of the invention the method for assembling trusses further comprises dropping the member, through the use of a dropping system, from a location above the support floor adjacent the first support floor side to the first slider support side below the support floor adjacent the first support floor side.

In still another embodiment of the invention the method for assembling trusses further comprises actuating the member, through the use of an actuating support, off of the lifting system outwardly from under the rigging table.

In yet another embodiment of the invention the method for assembling trusses further comprises delivering the member, through the use of a delivery system, to a location near the support floor from a cutting station; and wherein the delivery system comprises a plurality of rollers.

In further accord with an embodiment of the invention, the method further comprises determining, through the use of one or more sensors, when the member is located in the dropping system, the sliding system, or the lifting system and automatically delivering the member to the dropping system, the sliding system, or the lifting system when no member is detected; or determining, through the use of the one or more sensors, a position of a catcher in the dropping system, a slider in the slider system, or a lifter in the lifting system and automatically delivering the member to the dropping system, the sliding system, or the lifting system when the position of the catcher, the slider, or lifter is in a home position.

To the accomplishment the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE SEVERAL VIEWS OF THE DRAWINGS

The accompanying drawings illustrate preferred embodiments of the present disclosure, in which.

DETAILED DESCRIPTION OF EMBODIMENTS OF THE INVENTION

Figure 1:
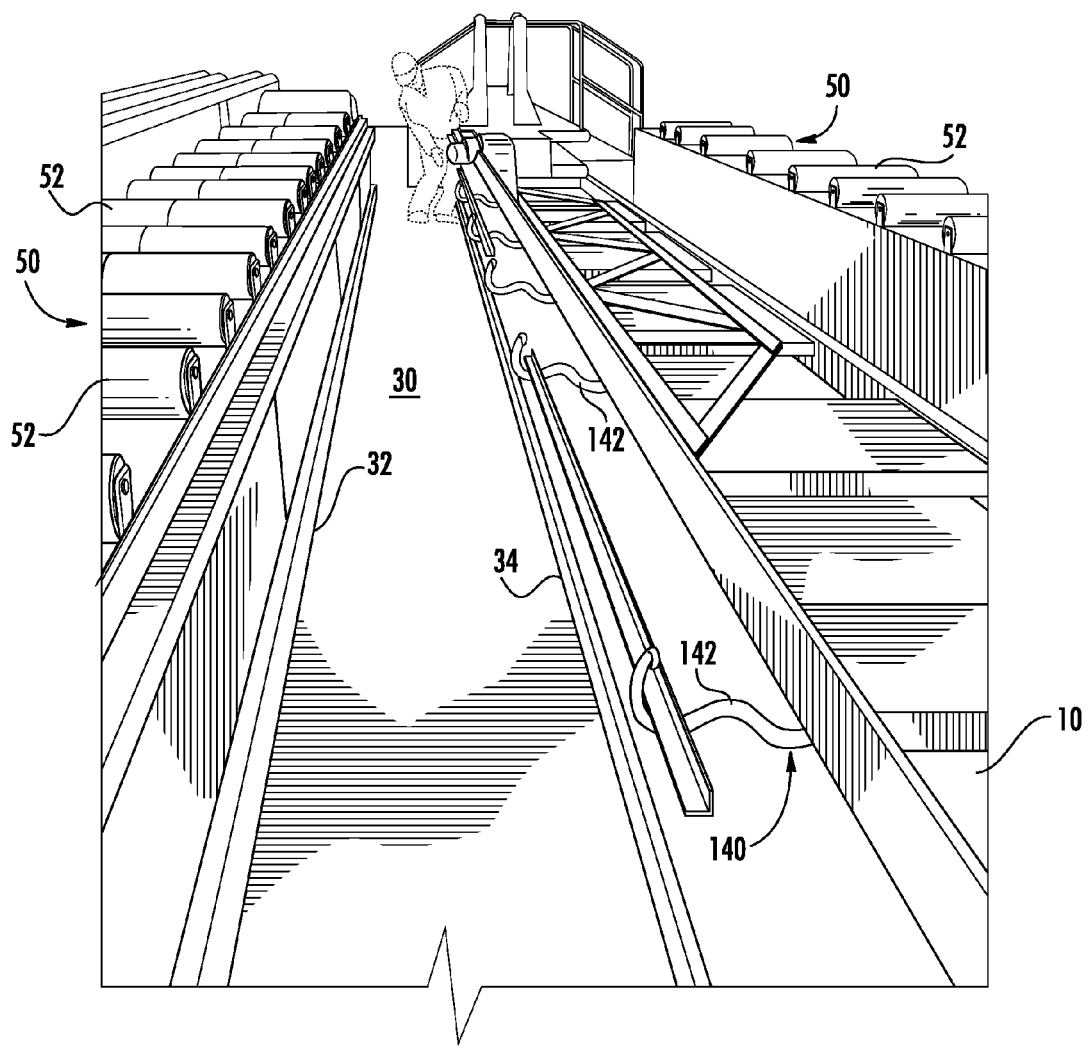
FIG. 1 is a perspective view of the rigging table system, in accordance with one embodiment of the invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIGS. 1-5 illustrate various views of the rigging table system 1, in accordance with embodiments of the invention. The present invention is configured to deliver members 200 to workers for assembling trusses for various structural applications. As described herein, the use of the term "member" 200 may be used to describe one or more web members 204, chord members 202, etc., which are utilized by a worker to assemble trusses for use in buildings, bridges, support structures, etc.

As illustrated in FIGS. 1-5, the rigging table system 1 may comprise a delivery system (i.e, roller bed 50), a rigging table 10, a support floor 30 with a first side 32 and a second side 34, rigging system supports 80, rigging table supports 150, a slider support 90, a drop system 70, a slider system 100, a lifter system 120, and an actuating support 140. The rigging table system 1 is configured to transport a member 200 from a cutting station to the rigging table 10 for assembly into a truss without the repetitive motion of lifting the members 200 over the head of the worker, or otherwise manually transporting the members 200 from the delivery system to the rigging table 10.

In some embodiments of the invention the delivery system is a roller bed 50 with one or more rollers 52. The delivery system may be supported above the support floor 30, on which the workers stand in the rigging table system 1, by roller supports 54 (e.g., support beams or the like). The members 200 may be transported from a cutting station, at which the web members and chord members are cut into the correct lengths and sizes for use in trusses, to a location near the workers (e.g., behind the workers as they are facing the rigging table 10 used to assemble the members 200 into trusses). In some embodiments of the invention the one or more rollers 52 on the roller bed 50 rotate to move the members 200 to the correct location along the length of the associated parallel rigging table 10. In some embodiments one or more of the rollers 52 may be powered (e.g., electrically, pneumatically, hydraulically, a combination thereof, etc.) to move the members 200 to the proper location for assembly. In other embodiments of the invention delivery systems other than rollers may be used to transport the members 200 to the proper location for assembly, such as but not limited to a conveyor belt system, a forklift, a pulley system, a crane, etc.

The delivery system is configured to allow a worker, or in other embodiments configured automatically, to drop one or more of the members 200 into a trough 60 (e.g., gap) that separates the roller bed 50 from the support floor 30 on which the workers stand. In some embodiments there is a trough wall 62 that separates the workers from the members 200 as they are dropped into the trough 60 for delivery under the support floor 30, as explained in further detail later. In some embodiments of the invention, two delivery systems (e.g., roller beds 50) may be located on opposite sides of the rigging table 10 to allow for the delivery of members 200 to opposite sides of the rigging table 10. The members 200 are transported below the support floor 30, under the support floor 30, and brought back above the support floor in front of the workers on the opposite side of the delivery system for assembly into trusses, as discussed in further detail herein.

The support floor 30 may be a floor that is suspended off of the ground, on which the workers stand when dropping the members 200 into the trough 60 and/or receiving the members 200 adjacent to the rigging table 10 for assembly into a truss. The support floor 30 may be suspended using support beams 96 underneath the support floor 30, or alternatively supported from support beams in the ceiling, or otherwise configured to support workers standing on the support floor 30 while allowing members 200 of various sizes to pass below the support floor. Regardless of how the support floor 30 is suspended, it is configured to allow members 200 to pass below the support floor 30, while still allowing workers to have room to stand in order to assemble the members 200 into trusses on the rigging table 10. The support floor 30, in some embodiments has a first side 32 and a second side 34, wherein the first side 32 is adjacent to the rolling bed 50 and the second side 34 is adjacent to the rigging table 10, such that the members 200 may be dropped down below the support floor 30 adjacent the first side 32 of support floor 30, travel beneath the support floor 30, and be delivered above the support floor 30 adjacent the second side 34 of the support floor 30. In various embodiments of the invention the support floor 30 may comprise a concrete floor, a grated floor system, a metal floor (solid or grated), a wood floor, a combination of types of flooring, or any other type of flooring that would support workers.

Figure 4:
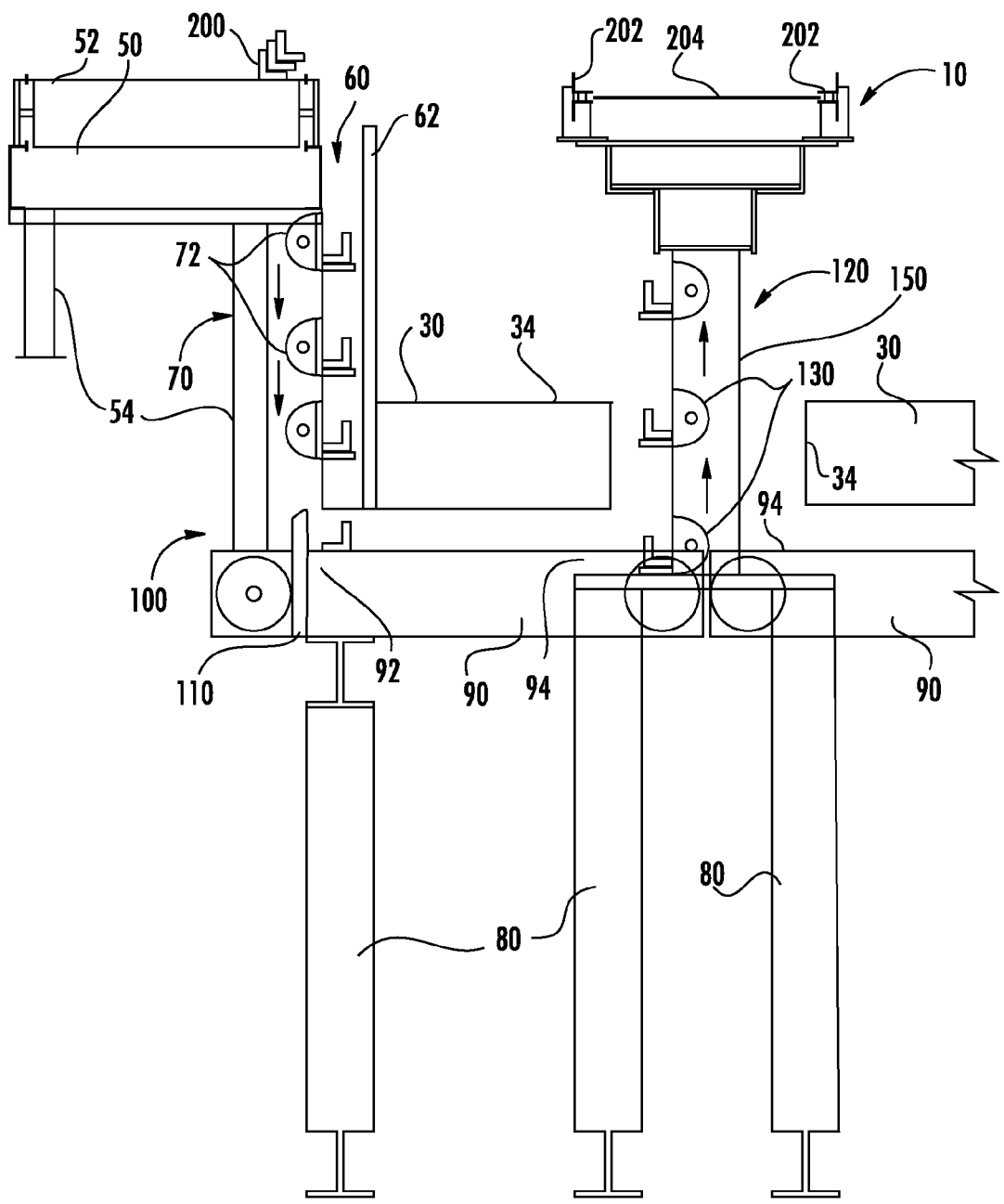
FIG. 4 is a front cross-sectional view of the rigging table system, in accordance with one embodiment of the invention
Figure 5:
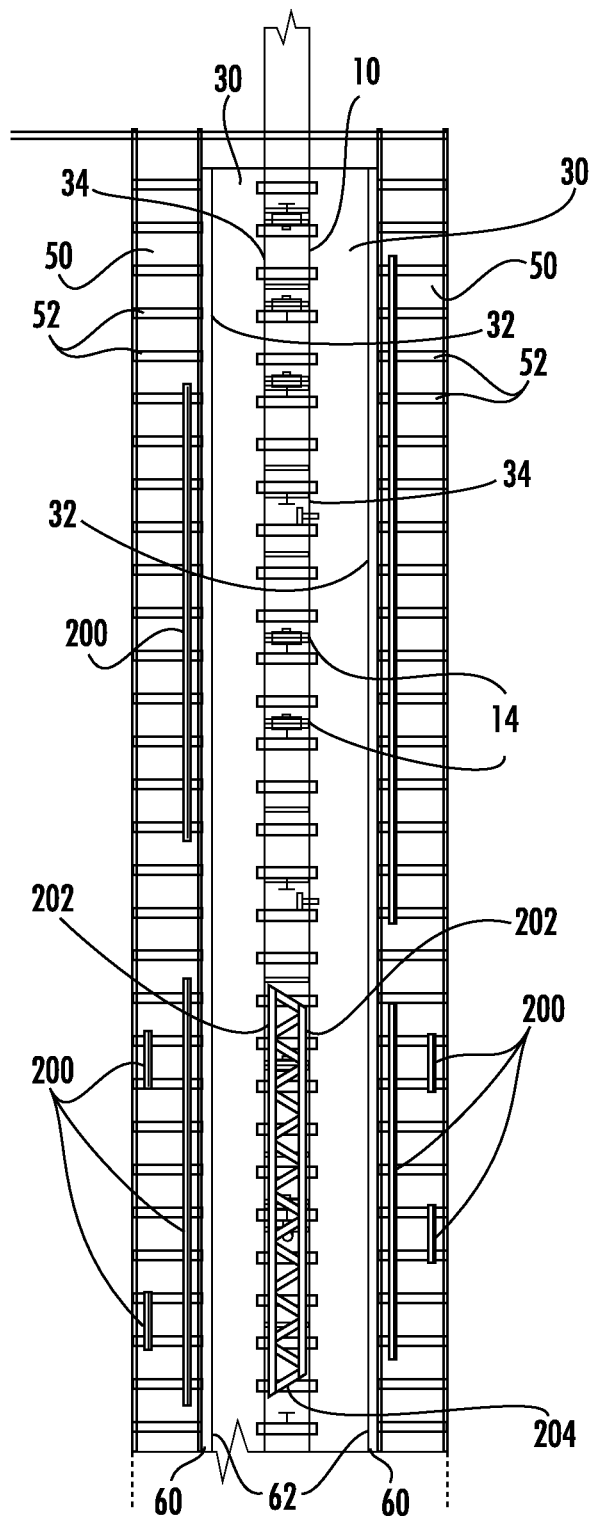
FIG. 5 is top view of the rigging table system, in accordance with one embodiment of the invention.

After a member is dropped into the trough 60 from the delivery system, the dropping system 70 is used to drop the members 200 below the level of the support floor 30. The dropping system 70 may be operatively configured with and/or located below the delivery system (e.g., roller bed 50) in order to drop the members 200 below the support floor 30, adjacent the first side 32 of the support floor 30, and down to the slider support 90. As illustrated in FIG. 4, in one embodiment of the invention the dropping system 70 may comprise a catcher 72 that spans at least a portion of the trough 60 and is configured to catch the member 200 as the member 200 is supplied to the trough 60 (e.g., either automatically or manually by a worker) and transport the member 200 to the slider support 90. In some embodiments of the invention the dropping system 70 may transport the member 200 to the slider support 90 in a smooth continuous motion. In other embodiments of the invention the dropping system 70 may transport the member 200 to the slider support 90 in one or more staged movements, for example, the dropping system 70 may move between three different vertical locations, and thus, drop three times in transporting the member 200 from the rolling bed 50 to the slider support 90. In one embodiment, as explained in further detail later, the dropping system 70 may comprise one or more sensors that recognize that a member 200 is present on the catcher 72, that there is no member located in the slider system 100, and/or the sliders 110 are in the home position, before the dropping system 70 is activated for allowing the catcher 72 to deliver the member 200 to the slider support 90. The dropping system 70 may actuate the catcher 72 using an electrically powered motor, or the like, as explained in further detail below.

In other embodiments of the invention, the dropping system 70 may comprise of other types of systems that supply the members 200 from the roller bed 50 to the slider supports 90. For example, in one embodiment of the invention the dropping system 70 may be located on or within the trough wall 62 instead of being located below the delivery system. In some embodiments the dropping system 70 may be a standalone system that is used to transport the members 200 from the delivery system to the slider support 90, it may be a system that is integrated with the delivery system (e.g., roller bed 50), it may be a system that is integrated with the slider support 90, it may be a system that is integrated with the slider system 100, and/or it may be a system that is integrated with the lifter system 120. In other embodiments of the invention the rigging system 1 may not have a dropping system 70, such that the members 200 are delivered directly to the slider supports 90 in the slider system 100.

Figure 2:
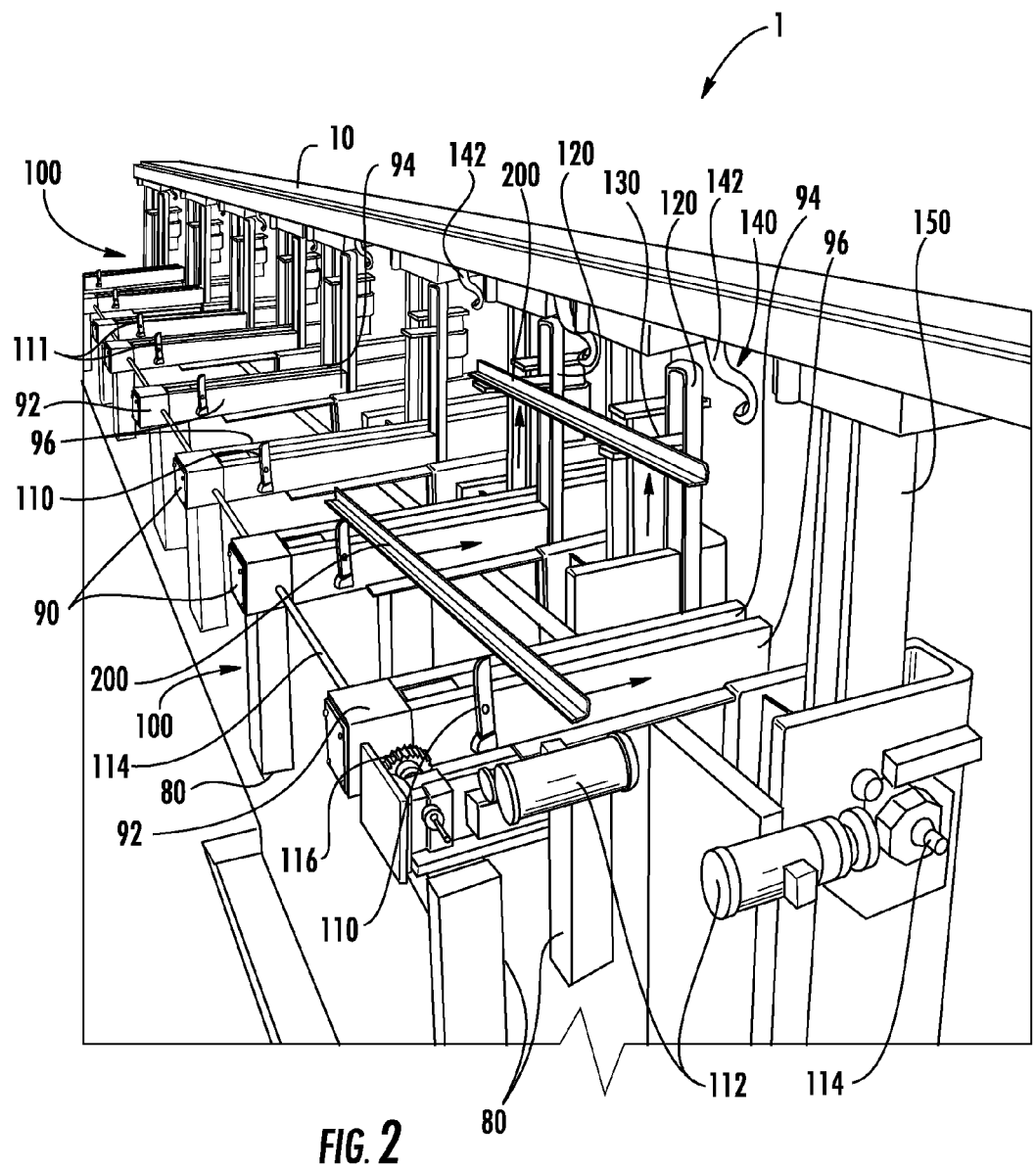
FIG. 2 is a perspective view of the rigging table system with the support floor and delivery system removed for illustrating the devices that transport the member horizontally and vertically, in accordance with one embodiment of the invention.

The slider supports 90 provide a location on which to receive the members 200 from the dropping system 70, as well as providing support for the slider system 100 in general. The slider support 90, like the support floor 30, may also have a first side 92 and a second side 94. The slider support 90 may comprise of a floor or beams that support the members 200 after the members have been dropped into the trough 60 and delivered by the dropping system 70. In the illustrated embodiment of the invention, the slider supports 90 are beams 96 spaced apart from one another along at least a portion of the distance of the rigging table 10, as illustrated in FIG. 2. The beams 96 provide the support for the slider system 100 that transports the members 200, after they are dropped from the delivery system 70, to workers at the rigging table 10 adjacent the second end 34 of the support floor 30. The spaces between the beams 96 allow workers to perform maintenance on the rigging table system 1 whenever there is an issue with one of the components described herein (e.g., slider system 100, etc.). In some embodiments of the invention, the slider supports 90 are wider than the support floor 30 located above the slider supports 90, such that the first end 92 of the slider support 90 extends outwardly past the first end 32 of the floor support 30, and the second end 94 of the slider support 90 extends outwardly past the second end 34 of the floor support 30. This configuration allows the dropping system 70 to drop the members 200 onto the first end 92 of the slider support 90 adjacent the first end 32 of the floor support 30, allows the slider system 100 to transport the members 200 to the second end 94 of the slider support 90, and allows the lifting system 120 to lift the members 200 off of the slider support 90 above the support floor 30 adjacent the second end 34 of the support floor 30.

In other embodiments of the invention the support floor 30 and slider support 90 may be configured in other ways that provide the same function of allowing the members 200 to drop adjacent the first end 32 of the support floor 30, pass below the support floor 30, and be lifted above the support floor 30 adjacent the second end 34 of the support floor 30. In some embodiments of the invention, the slider floor 90 may be a solid floor, it may be located directly on the ground, set above the ground, or be of some other configuration that allows the members 200 to be dropped below the support floor 30 at the first end 32, transported horizontally under the support floor 30 and lifted above the support floor 30 at the second end 34. In some embodiments of the invention the entire rigging table system 1, or at least a portion thereof, may be located below ground level (e.g., in a pit). For example, as illustrated in FIGS. 1-5, the portions of the rigging table 1 located below the support floor 30 are located below ground, while the support floor 30 is located at ground level of the facility that houses the rigging table system 1.

Once the members 200 are delivered to the slider support 90, a slider system 100 may be utilized to transport the members 200 from the first side 92 of the slider supports 90 to the second side 94 of the slider supports 90. In some embodiments, one or more horizontal sliders 110 may transport the members 200. In the embodiment illustrated in FIG. 2, the sliders 110 are moved horizontally to transport the member 200 across the slider supports 90, as illustrated by the arrows. In some embodiments, the sliders are moved through the use of one or more electric motors 112, as will be explained in further detail later. The sliders 110, in one embodiment, as illustrated in FIG. 2 may be positioned on one of the outside edges of the slider supports 90 and move horizontally across at least a portion of the length of the slider supports 90. In other embodiments of the invention the sliders 110 may be located within the slider supports 90, such as within the middle (or another location) of the beams 96. As was described with respect to the dropping system 70, the slider system 100 may comprise one or more sensors that recognize that a member 200 is present on the slider support 90, that there is not member located in the lifting system 120, and/or the lifters 130 are in the home position, before the slider system 100 is activated to move the member 200 to the lifting system 120. The slider system 100 may actuate the sliders 110 using an electrically powered motor, or the like, as explained in further detail below.

At the second side 94 of the slider support 90 the members 200 are located in a position over the lifters 130 of the lifter system 120. The lifter system 120 comprises one or more vertical lifters 130, which may be operatively coupled to the rigging table supports 150, such that the vertical lifters 120 can move relative to the rigging table supports 150 to transport the members 200 from the second side 94 of the slider supports 90, above the support floor 30 adjacent the second side 34 of the support floor 30, to a position below the top of the rigging table 10. In some embodiments of the invention, the vertical lifters 130 may be operatively coupled to supports other than the rigging table supports 150, but may otherwise be located below the rigging table 10 or adjacent the rigging table 10. Regardless of the configuration, the vertical lifters 130 transport the members 200 from the second side 94 of the slider supports 90 to above the support floor 30 adjacent the second side 34 of the support floor 30. As illustrated in FIG. 2, the vertical lifters 130 in the lifting system 120 are movable in the same or similar way as previously described with respect to the catcher 72 in the dropping system 70 and sliders 110 in the slider system 110, respectfully. As explained in further detail later, the lifters 130 may be elevated through the use of an electric motor 112.

In some embodiments of the invention the members 200 may not be in an ideal position for the workers to reach after they are transported vertically adjacent the second side 34 of the support floor 30 because the workers may have to reach down, squat, and/or bend over tens or hundreds of times a day to reach the members 200. Therefore, in some embodiments of the invention, the rigging table system 1 may include actuating supports 140 that are used to position the members 200 in a more convenient location for the workers to access. For example, after the members 200 are transported vertically through the use of the vertical lifters 130, the members 200 may not be in a position in which a worker can reach the member 200 to place it on the rigging table 10 for assembly into a truss. In order to provide the workers better access to the members 200 actuating supports 140 rotate outwardly to lift the members 200 out from under the rigging table 10, and away from the rigging table supports 150. For example, as illustrated by FIG. 1 and FIG. 2, the actuating supports 140 are hooks 142 that begin in a retracted position under the rigging table 10 and are actuated outwardly from under the rigging table 10 to provide access to the members 200. In some embodiments of the invention the actuating supports 140 may be actuated only when called for by the workers, such as through the use of call button, switch, dial, or the like. However, in other embodiments of the invention the actuating supports 140 may actuate automatically, for example, when a sensor identifiers members 200 on the vertical lifter 130 after the members 200 are lifted above the support floor 30. In other embodiments of the invention the actuating supports 140 may be bars, plates, hooks 142, or the like. In other embodiments of the invention the actuating supports 140 may be the lifters 130, or may be incorporated as a part of the lifters 130.

In some embodiments of the invention the dropping system 70, the slider system 100, and/or the lifter system 120 are separate independent systems, and thus the catchers 72, sliders 110, the lifters 130, and/or the actuating supports 140 are separate independent devices. The various systems may work independently of each other, such that the catchers 72 may supply a member 200 to the slide support 90, while at the same time sliders 110 are transporting another member 200 across the slide support 90, while at the same time the vertical lifts 120, are transporting another member 200 vertically, and/or while at the same time the actuating hooks 142 are rotating a member out from under the rigging table 10. In some embodiments there may be one or more catchers 72, sliders 110, lifters 130, or actuating supports 140 within a system. For example, one slider may move a member in the slider system 100, while a second slider 110 is in the home position ready to receive another member 200 in the slider system 100 at the same time. In other embodiments of the invention only one catcher 72, slider 110, lifter 130, or actuating support 140 may be located in a system, such that each may have to return to the home position before accepting another member 200 in the system.

In other embodiments of the invention the dropping system 70 and catchers 72, the slider system 100 and sliders 110, the lifting system 120 and lifters 130, and/or the actuating supports 140 (e.g., hooks 142) may be integral with each other to reduce the redundancy of parts in the system. For example, a single system may have a single device that performs two or more of the catching of the dropped members 200, the horizontal sliding of the members 200, the vertical lifting of the members 200, and/or the outward transport of the member 200 from under the rigging table. In one embodiment, the catchers 72, the sliders 100, the lifts 120, and/or the actuating supports 140 are integral in a single device, the single device is used to catch the members 200 as they are dropped into the trough 60; then the single device transports the members 200 horizontally along the length of the slider support 90; then single device lifts the members 200 vertically with respect to the rigging table supports 150 to a position adjacent the second side 34 of the support floor 30; and thereafter, the single device rotates the members 200 outwardly.

As previously discussed above, sensors may be used in the dropping system 70, the sliding system 100, and/or the lifting system 120, to determine if a member is located on the catcher 72, the slider 110, lifter 130 and/or on the actuating support 140. In other embodiments, the sensor, or other sensors, may be used to identify if the catchers 72, the sliders 110, the lifters 130, and/or the actuating supports 140 are in the open or home position (e.g., ready to receive a member 200 from the previous system), or in the in use position (e.g., moving a member 200 the next location or returning to the open position). In some embodiments of the invention, a system waits until a sensor (e.g., the sensor in the next system, etc.) indicates that the next system has returned to the open position. For example, before the dropping system 70 allows the catcher 72 to deliver the member 200 to the slider system 100, the sensor in the slider system 100 determines if a member 200 is located in the slider system 100 or if the slider 110 in the slider system 100 is in the open position. Additionally, for example, the slider system 100 may not deliver a member 200 to the lifting system 120 until the lifting system 120 has delivered the member 200 located on the lifts 130 to the actuating support 140 and returned to home position, in which the lifts 130 may receive another member 200.

As previously discussed the catchers 72, the sliders 110, the lifters 130, and/or the actuating supports 140 may be moved to transport the members 200 through the use of an electric motor 112. As illustrated in FIG. 2, the electric motor 112 turns a rod 114 with gears 1216 (not fully illustrated), the gears rotate a chain (not illustrated) to move the catchers 72, sliders 110, the lifters 130, and or the actuating supports 140, as illustrated in FIG. 2. In other embodiments of the invention, the catchers 72, the sliders 110, the lifters 130, and/or the actuating supports 140 may use one or more other devices besides electric motors, such as a pneumatic device, hydraulic device, or the like, to move the members between each system in the rigging table system 1.

A rigging table 10, is operatively coupled to the rigging table supports 150, such that after the worker receives the members 200 from lifters 130, or the actuating supports 140, a worker may place the member 200 on the rigging table 10 for assembly. The members 200 may comprise of chord members 202 and web members 204. In some embodiments only the chord members 202 may be supplied to the workers by passing the chord members 202 under the support floor 30, while the web members 204 may be taken off the delivery system by the worker and delivered to the rigging table 10 in a manual process.

Figure 3:
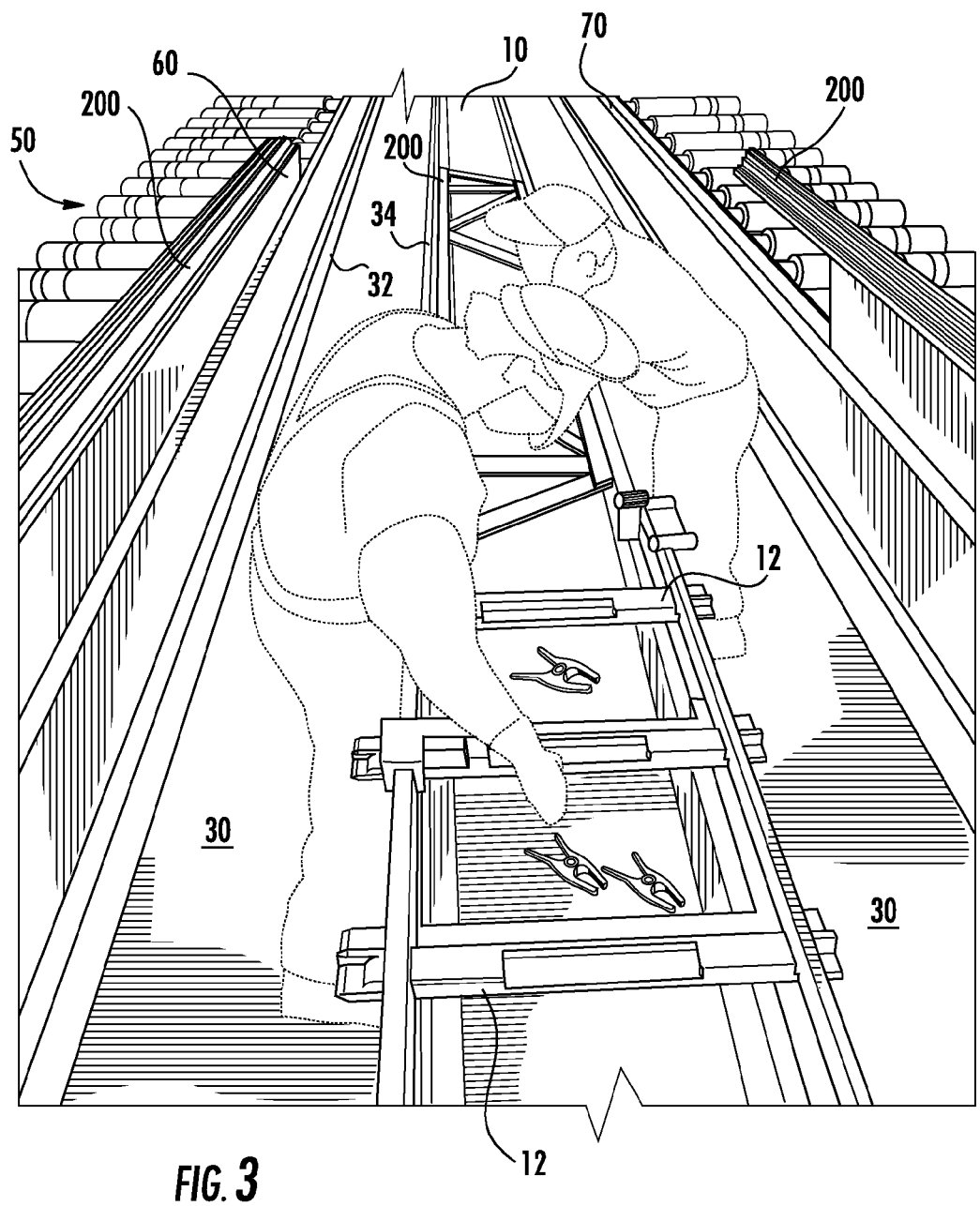
FIG. 3 is a perspective view of the rigging table system illustrating trusses being assembled on the rigging table, in accordance with one embodiment of the invention.

The workers assemble the members 200 into the jigs 12 on the rigging table 10 to assemble the members 200 into trusses, as illustrated in FIG. 3. The workers weld the members 200 of the trusses together and/or clamp the trusses together for welding further down the rigging table 10, if necessary. After the members are assembled in whole, or in part, the workers can remove the partial truss or completed truss out of the jigs 12 on the rigging table 10. In some embodiments of the invention the rigging table 10 may comprise one or more rollers 14 that can be utilized to transport the partial or completed truss along rigging table 10 for additional welding, adding additional members, and/or performing other steps to complete the truss assembly.

As illustrated in FIGS. 1-5 both sides of the rigging table 10 may have a delivery system (e.g., roller bed 50), a support floor 30, rigging table supports 150, rigging system supports 80, slider supports 90, a dropping system 70, a slider system 100, a lifter system 120, and an actuating support 130, etc., such that workers may receive members 200 from under the support floor 30 on either side of the rigging table 10 to assemble trusses in a more efficient process that reduces injuries to the workers by reducing repetitive lifting actions.

In some embodiments of the invention there may not be a dropping system 70, such that the members 200 are transported by the delivery system (e.g., rolling bed 50) directly to the first side 92 of the slider support 90. Therefore, in some embodiments the members are transported by the slider system 100 and lifting system 120 as previously described. In other embodiments there may be no dropping system 70 and no slider system 100, such that the members 200 are transported by the delivery system (e.g., rolling bed 50) directly to a location at or near the lifting system 120. Therefore, in some embodiments the members are only transported by the lifting system 120 as previously described.

Figure 6:
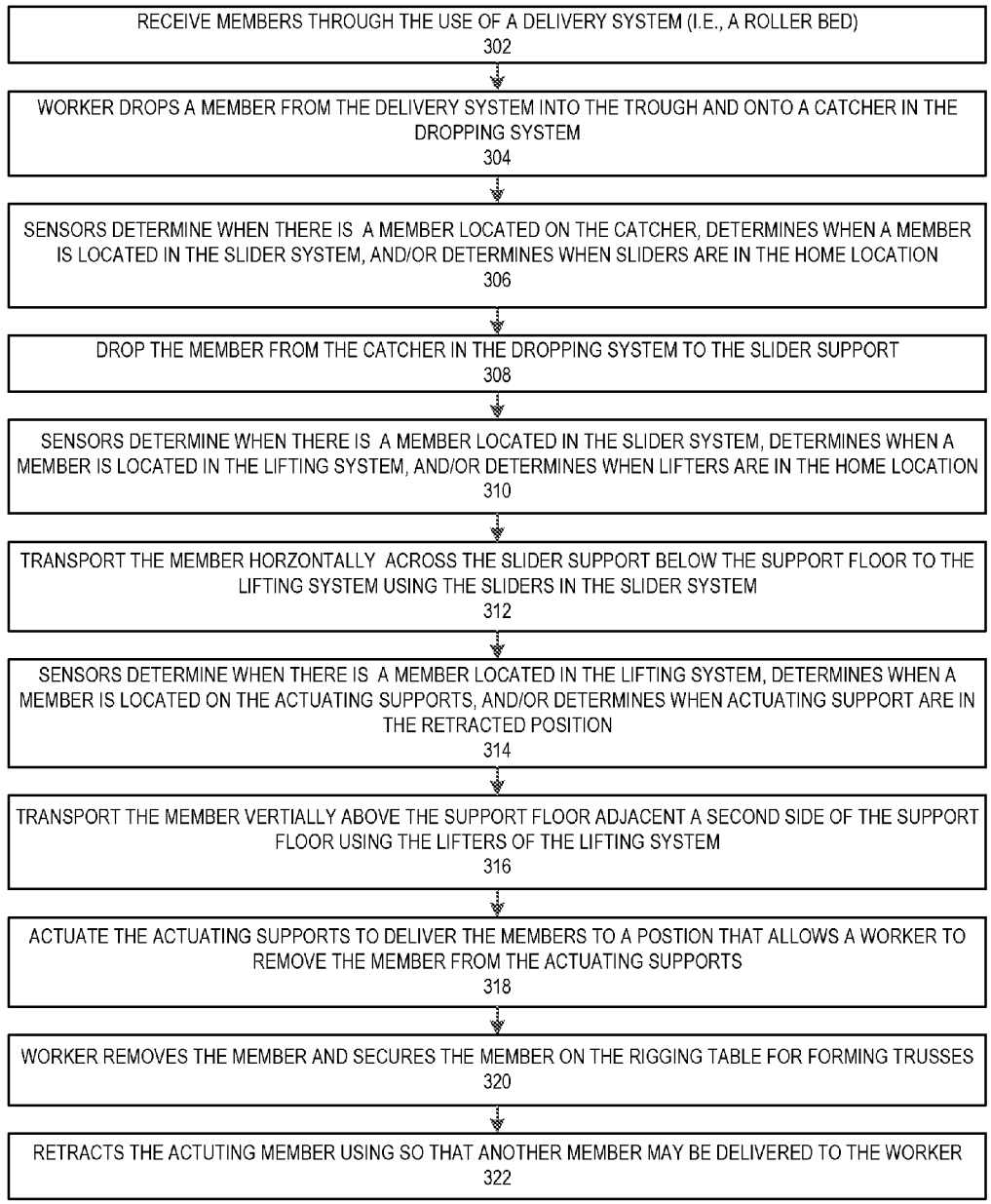
FIG. 6 is a method of utilizing the rigging table system, in accordance with one embodiment of the invention.

FIG. 6 illustrates a truss assembly process 300 utilizing a rigging table system 1, in accordance with one embodiment of the invention. As illustrated by block 302 of FIG. 6, members are delivered from the cutting station to a location behind the workers using a delivery system, such as a roller bed 50. After the members 200 are delivered, a worker may drop one or more members into the trough 60 between the roller bed 50 and the trough wall 62 onto a catcher 72 in a dropping system 70, as illustrated by block 304. In some embodiments of the invention the worker may not be able to drop a member 200 into the trough 60 until a catcher 72 has returned to the home location and no member is present on the catcher 72. For example, the trough 60 may have a cover or partial cover that prevents a worker from dropping a member 200 into the trough 70 when a member is already located on the catchers 72.

As illustrated by block 306, a sensor then determines when there is a member 200 located on the catcher 72 (e.g., has been dropped on the catcher 72), determines when a member 200 is located at the next location (e.g., on the slider support 90), and/or determines when the sliders 110 are located at their home position on the first side 92 of the slider support 90, through the use of one or more sensors and/or signals (e.g., electrical signal, audio signal, optical signal, etc.). When a member 200 is identified on the catcher 72, and no member 200 is detected at the next location on the slider support 90 and/or the sliders 110 are located in their home position, the dropping system 70 uses the catchers 72 to drop the members 200 down to the slider supports 90 located below the support floor 30 on the first side 92 of the slider supports 90, as illustrated by block 308. As previously described above the dropping system 70 may drop the members 200 through one or more stepped drops that progressively lower the members 200 to the slider support 90. For example, this may prevent damage to the members 200, prevent the members 200 from getting stuck, or prevent the members from landing in a position in which the sliders 110 could not slide the members 200, which may occur if the members 200 were simply dropped through the trough 60 onto the slider support 90 without the dropping system 70.

As illustrated by block 310, the slider system 100 determines when a member 200 has been delivered by the dropping system 70, determines when a member 200 is located at the next location (e.g., in the lifter system 120), and/or determines when the vertical lifters 130 are located in their home location (e.g., below the surface of the second side 94 of the slider support 90), through the use of one or more sensors and/or signals. As illustrated by block 312 when the slider system 100 determines a member 200 has been delivered to the slider support 90, when no member 200 is located in the lifter system 120, and when the lifters 130 are located in their home location, then the sliders 110 may transport the member 200 horizontally below the support floor 30 to the second side 94 of the slider support 90.

Thereafter, the lifting system 120 determines when a member 200 is present within the lifting system 100, determines when a member 200 is located at the next location on the actuating supports 140, and/or when the actuating supports 140 are in the extended position or in the retracted position, through the use of one or more sensors and/or signals, as illustrated by block 314. As illustrated by block 316, when the lifter system 120 determines that a member 200 is present within the lifting system 100, when no members 200 are located on the actuating supports 140, and when the actuating supports 140 are in the retracted position, the lifters 130 transport the members 200 vertically above the second side 34 of the support floor 30 to a location below the rigging table 10.

As illustrated by block 318, when the workers are ready to receive the members 200, the workers may use a call button to actuate the actuating supports 140 to deliver the members 200 out from underneath the rigging table 10 to a location from which the workers can reach the members 200. In some embodiments, the call button may be hand actuated, foot actuated, or the like. As illustrated by block 320 the worker removes the members 200 and secures the members 200 on the rigging table for assembling the trusses. In other embodiments of the invention the actuating supports 140 may be retracted (e.g., returned to the retracted position from the extended position) using the call button after the workers have removed the members 200, as illustrated by block 322. In some embodiments the actuating members 140 may be extended and/or retracted automatically when a member is presented or removed from the actuating members, through the use of one or more sensors or signals.

The sensors and signals described above may be a single sensor or multiple sensors that perform the actions described above.

As described herein, when discussing the movement of the members 100 as being dropped vertically downward, moved horizontally sideways or lifted vertically upward, it is understood that the movements in the vertical direction or horizontal direction may not be exactly vertical or horizontal, such that the term substantially or generally vertical or horizontal includes movements that are exactly vertical or horizontal, or out of the exact vertical or horizontal plane.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A rigging table system, comprising:
   a rigging table;
   a support floor adjacent at least one side of the rigging table having a first support floor side and a second support floor side;
   a slider support located below the support floor having a first slider support side and a second slider support side;
   a dropping system, wherein the dropping system delivers a member to the first slider support side below the support floor adjacent the first support floor side;
   a slider system, wherein the slider system transports the member from the first slider support side to the second slider support side below the support floor; and
   a lifting system, wherein the lifting system lifts the member from the second slider support side to above the support floor adjacent the second support floor side.

2. The rigging table system of claim 1, further comprising an actuating support, wherein the actuating support extends outwardly to deliver the member from the lifting system out from a position under the rigging table.

3. The rigging table system of claim 2, wherein the actuating support is extended outwardly by a call signal activated by a worker.

4. The rigging table of claim 2, wherein the actuating support comprises hooks.

5. The rigging table system of claim 1, further comprising:
   a delivery system configured for transporting the members from a cutting station to a location adjacent the first side of the support floor; and
   wherein the delivery system comprises a plurality of rollers.

6. The rigging table system of claim 1, wherein two or more of the dropping system, the sliding system, or the lifting system are a single system.

7. The rigging table system of claim 1, further comprising one or more sensors, wherein the sensors determine when the member is located in the dropping system, the sliding system, or the lifting system and automatically delivering the member to the dropping system, the sliding system, or the lifting system when no member is detected.

8. The rigging table system of claim 1, further comprising one or more sensors, wherein the sensors determine a position of a catcher in the dropping system, a slider in the slider system, or a lifter in the lifting system and automatically delivering the member to the dropping system, the sliding system, or the lifting system when the position of the catcher, the slider, or lifter is in a home position.

9. A rigging table system, comprising:
   a rigging table;
   a support floor adjacent at least one side of the rigging table having a first support floor side and a second support floor side;
   a slider support located below the support floor having a first slider support side and a second slider support side;
   a slider system, wherein the slider system transports a member from the first slider support side to the second slider support side below the support floor; and
   a lifting system, wherein the lifting system lifts the member from the second slider support side to above the support floor adjacent the second support floor side.

10. The rigging table system of claim 9, further comprising an actuating support, wherein the actuating support extends outwardly to deliver the member from the lifting system out from a position under the rigging table.

11. The rigging table system of claim 9, further comprising:
    a delivery system configured for transporting the members from a cutting station to the first slider support side.

12. The rigging table system of claim 9, wherein the sliding system and the lifting system are a single system.

13. The rigging table system of claim 9, further comprising one or more sensors, wherein the sensors determine when the member is located in the sliding system or the lifting system and automatically delivering the member to the sliding system or the lifting system when no member is detected, or wherein the sensors determine a position of a slider in the slider system or a lifter in the lifting system and automatically delivering the member to the sliding system or the lifting system when the position of the slider or lifter is in a home position.

14. A rigging table system, comprising:
    a rigging table;
    a support floor adjacent at least one side of the rigging table having a first support floor side and a second support floor side; and a transport system located under the support floor, wherein the transport system transports a member under the support floor from the first support floor side to the second support floor side and lifts the member from under the support floor adjacent the second support floor side to above the support floor adjacent the second support floor side.

15. A method for assembling trusses comprising:

transporting a member, through the use of a transport system, under a support floor from a first support floor side to a second support floor side;

lifting the member, through the use of a lifting system, from under the support floor adjacent the second support floor side to above the support floor adjacent the second support floor side;

placing the member on the rigging table; and assembling the member to at least another member on the rigging table.

16. The method for assembling trusses of claim 15, wherein transporting the member comprises transporting the member, through the use of a slider system, from a first slider support side to the second slider support side of a slider support located below the support floor.

17. The method for assembling trusses of claim 16, further comprising:

dropping the member, through the use of a dropping system, from a location above the support floor adjacent the first support floor side to the first slider support side below the support floor adjacent the first support floor side.

18. The method for assembling trusses of claim 15, further comprising:

actuating the member, through the use of an actuating support, off of the lifting system outwardly from under the rigging table.

19. The method for assembling trusses of claim 15, further comprising:

delivering the member, through the use of a delivery system, to a location near the support floor from a cutting station; and wherein the delivery system comprises a plurality of rollers.

20. The method of claim 17 further comprising:

determining, through the use of one or more sensors, when the member is located in the dropping system, the sliding system, or the lifting system and automatically delivering the member to the dropping system, the sliding system, or the lifting system when no member is detected; or determining, through the use of the one or more sensors, a position of a catcher in the dropping system, a slider in the slider system, or a lifter in the lifting system and automatically delivering the member to the dropping system, the sliding system, or the lifting system when the position of the catcher, the slider, or lifter is in a home position.

* * * * *